United States Patent
Verriet (10) Patent No.: US 7,137,491 B2
(45) Date of Patent: Nov. 21, 2006

(54) SHOCK ABSORBER NON-VIBRATING CHECK VALVE ASSEMBLY

(75) Inventor: Frank Verriet, Mississauga (CA)

(73) Assignee: ArvinMeritor Technology, LLC, Troy, MI (US)

( * ) Notice: Subject to any disclaimer, the term of this patent is extended or adjusted under 35 U.S.C. 154(b) by 474 days.

(21) Appl. No.: 10/282,658

(22) Filed: Oct. 29, 2002

(65) Prior Publication Data

US 2004/0079601 A1    Apr. 29, 2004

(51) Int. Cl.
*F16F 9/32*    (2006.01)
(52) U.S. Cl. .............................. 188/322.13; 137/533.31
(58) Field of Classification Search ........... 188/322.13, 188/322.14, 322.15; 137/528, 533.31, 540
See application file for complete search history.

(56) References Cited

U.S. PATENT DOCUMENTS

| 4,437,492 A | * | 3/1984 | Taylor | 137/543.13 |
|---|---|---|---|---|
| 4,593,921 A | | 6/1986 | Marier | |
| 4,826,260 A | | 5/1989 | Plourde | |
| 4,874,066 A | * | 10/1989 | Silberstein | 188/280 |
| 5,078,240 A | * | 1/1992 | Ackermann et al. | 188/285 |
| 5,085,299 A | * | 2/1992 | Spiess et al. | 188/266.5 |
| 5,370,198 A | | 12/1994 | Karpik | |
| 5,611,681 A | * | 3/1997 | Everitt | 417/569 |
| 5,667,031 A | | 9/1997 | Karpik | |
| 5,881,834 A | | 3/1999 | Karpik | |
| 6,035,896 A | * | 3/2000 | Liardet | 137/849 |
| 6,102,075 A | * | 8/2000 | Phillips | 138/31 |
| 6,260,832 B1 | * | 7/2001 | Vignocchi et al. | 267/64.15 |

FOREIGN PATENT DOCUMENTS

| CH | 674251 | * | 5/1990 |
|---|---|---|---|
| JP | 20010350993 | * | 4/2001 |

OTHER PUBLICATIONS

U.S. Appl. No. 09/950,099, filed Sep. 10, 2001, "Shock Absorber Through the Rod Damping Adjustment".

* cited by examiner

*Primary Examiner*—Devon Kramer
(74) *Attorney, Agent, or Firm*—Carlson, Gaskey & Olds (57) ABSTRACT

A check valve assembly for a shock absorber includes a tapered valve seat and a polygonal check valve which includes a plurality of flat surfaces. Each pair of flat surfaces intersects at a linear engagement surface which slidably engages a cylindrical chamber. When the polygonal check valve is in an open position, fluid flows along the flat surfaces even though the linear engagement surfaces are essentially in contact with the cylindrical chamber. Lateral movement of the check valve is effectively eliminated which minimizes noise and vibration of the cheek valve assembly.

20 Claims, 3 Drawing Sheets

SHOCK ABSORBER NON-VIBRATING CHECK VALVE ASSEMBLY

BACKGROUND OF THE INVENTION

This invention relates to a shock absorber check valve, and more particularly, to a shock absorber having a check valve damping adjustment.

Shock absorbers are used in vehicles to dampen inputs from roadways. For some vehicle applications, such as snowmobiles, it may be highly desirable to provide the operator with the ability to externally adjust damping characteristics of the shock absorber. To this end, some shock absorbers have incorporated a fluid passageway in the shock absorber piston rod to fluidly connect the rebound and compression fluid chambers. The rod includes a longitudinal bore with a plunger arranged within the bore. An adjustment knob, which is accessible to the vehicle operator from the exterior of the shock absorber, cooperates with the plunger to move the plunger between various positions to control the flow of fluid through the passageway. In this manner, the operator may adjust damping characteristics.

A fluid bypass passageway typically extends between portions to fluidly connect rebound and compression chambers. In this manner, fluid is permitted to flow through the rod to provide damping characteristics in addition to those damping characteristics typically provided by the piston. A valve assembly, which may include a one-way check valve, is arranged within the passageway for controlling the flow of fluid between the rebound and compression chambers through the passageway. Disadvantageously, the shock absorber rod may encounter erratic and noisy behavior in recoil forces verses displacement due to operation of the check valve.

Accordingly, it is desirable to provide a check valve assembly which minimizes or eliminates the erratic and noisy behavior.

SUMMARY OF THE INVENTION

The shock absorber according to the present invention provides a shock absorber body defining a cavity that is at least partially filled with hydraulic fluid. A piston is slidably arranged within the body and separates the cavity into rebound and compression fluid chambers. A rod is secured to the piston and includes first and second portions that are respectively adjacent to the rebound and compression chambers. A fluid passageway extends between the first and second portions to fluidly connect the rebound and compression chambers. In this manner, fluid is permitted to flow through the rod to provide damping characteristics in addition to those damping characteristics typically provided by the piston.

A check valve assembly is arranged within the fluid passageway for controlling the flow of fluid between the rebound and compression chambers through the fluid passageway. The check valve assembly includes a tapered valve seat and a polygonal check valve which includes a plurality of flat surfaces. Each pair of flat surfaces intersects at a linear engagement surface which slidably engages a cylindrical chamber. The plurality of flat surfaces provide for relatively small tolerances between the liner engagement surfaces and the cylindrical chamber in comparison to a conventional ball valve.

When the polygonal check valve is in an open position, fluid flows along the flat surfaces even though the linear engagement surfaces are essentially in contact with the cylindrical chamber. Lateral movement of the check valve is effectively eliminated which minimizes noise and vibration of the check valve assembly. Moreover, dampening force remains effectively constant in comparison to an erratically moving ball valve.

The present invention therefore comprises a check valve assembly which minimizes or eliminates erratic and noisy behavior.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
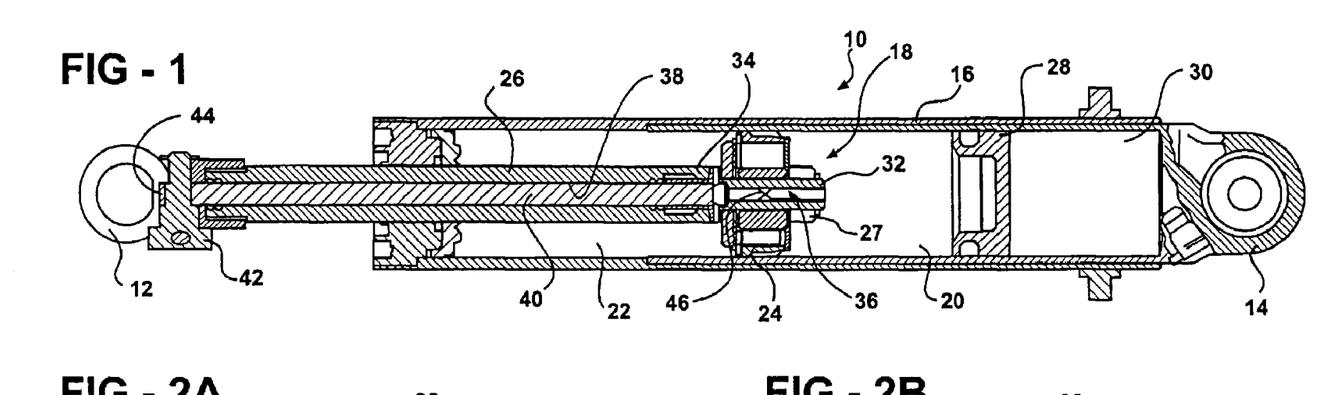
FIG. 1 is a general cross-sectional view of a monotube shock absorber.

FIG. 1 illustrates a general perspective view of a monotube shock absorber 10. It should be understood that other shock absorbers and other devices wholly unrelated to shock absorbers will benefit from the present invention.

The shock absorber 10 is connected between a suspension and a vehicle body by upper 12 and lower 14 ends. The absorber 10 includes a body 16 defining a cavity 18 that is filled with hydraulic fluid. A piston 24 is disposed within the cavity 18 and separates compression 20 and rebound 22 fluid chambers from one another. A rod 26 is secured to the piston 24 typically by a nut 27 to transmit the input received from the upper end 12 to the piston 24 to move the piston 24 within the cavity 18. A floating piston 28 is arranged in the cavity 18 to separate the compression chamber 20 from a gas chamber 30. As is known in the art, the floating piston 28 moves within the cavity 18 to accommodate the additional volume of the rod 26 during the compression and rebound strokes.

The piston 24 typically includes numerous valves and passages that controls the flow of fluid between the compression 20 and rebound 22 chambers to define the damping characteristics of the absorber 10 as the piston 24 moves longitudinally in the cavity 18. For some shock absorber applications, such as for snowmobiles, it may be desirable to provide an adjustment assembly to permit the operator to adjust damping characteristics of the absorber 10. To this end, the rod 26 has included a bore 38 with a plunger 40 movable within the bore 38. A cylindrical chamber 36 extends from a first portion 32 adjacent to the compression chamber 20 to a second portion 34 that is adjacent to the rebound chamber 22. Hydraulic fluid is permitted to flow between the compression 20 and rebound 22 chambers through the cylindrical chamber 36.

One end of the plunger 40 cooperates with an adjustment knob 42 mounted on the absorber 10, which is accessible to the operator. The adjustment knob 42 includes a cammed surface 44 that contacts the end of the plunger 40 to move the plunger 40 within the bore 38. The plunger 40 is moved within the bore 38 to manipulate an end of the plunger 40 opposite the adjustment knob 42 within the cylindrical chamber 36. That is, the plunger 40 is manipulated to increase or decrease the flow of hydraulic fluid through the cylindrical chanter 36 to adjust the damping characteristics provided by fluid flow through the cylindrical chamber 36.

The cylindrical chamber 36 forms a portion of a check valve assembly 46 that permits adjustment of the damping characteristics during either the compression or rebound strokes depending upon the particular application. For example, it may be desirable to provide adjustment of the absorber for the compression stroke only to accommodate a different number of passengers or passenger weights on the snowmobile.

Figure 2A:
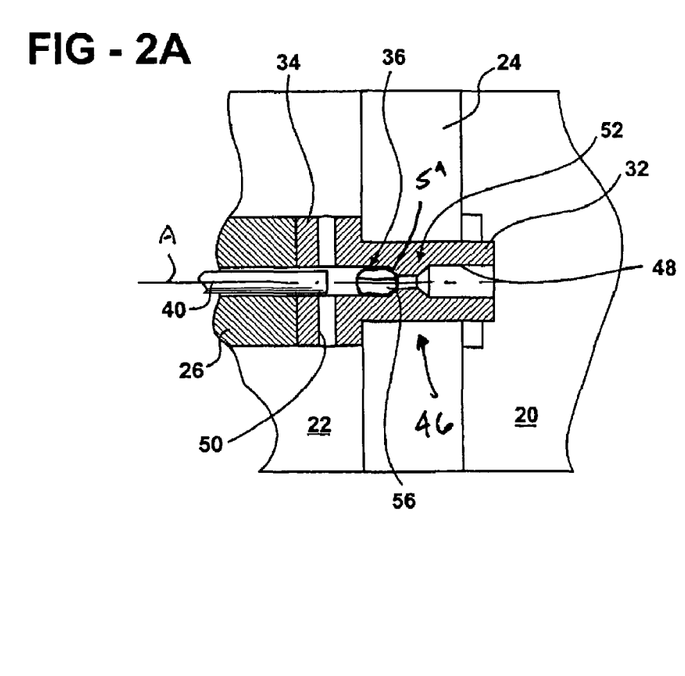
FIG. 2A is an enlarged cross-sectional view of a shock absorber rod with a first embodiment of the present invention valve assembly in a closed position.

Referring to FIG. 2A, the check valve assembly 46 includes the cylindrical chamber 36 which defines a longitudinal axis A. A first passage 48 extends longitudinally from the first portion 32 in the direction of the plunger 40. The cylindrical chamber 36 also communicates with a second passage 50 extending from the second portion 34 transverse to the first passage 48 such that the first 48 and second 50 passages meet at an intersection. The end of the plunger 40 is arranged within the cylindrical chamber 36 at the intersection to adjust the flow therethrough.

Figure 2B:
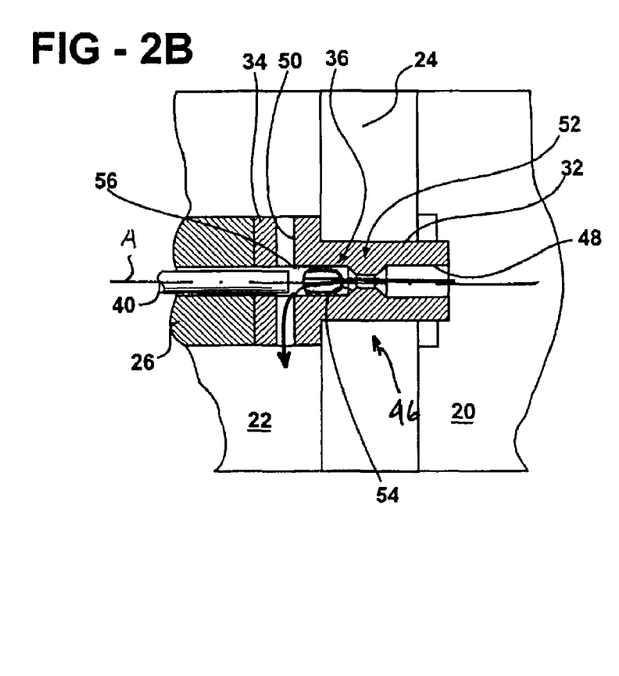
FIG. 2B is the valve assembly shown in FIG. 2A in an open position.

FIGS. 2A and 2B depicts an arrangement in which adjustment of the plunger 40 affects the damping characteristics of the absorber 10 during the compression stroke only. The check valve assembly 46 preferably includes a one-way check valve assembly 52 to prevent flow to the cylindrical chamber 36 during the rebound stroke. Conversely, the check valve assembly 46 permits flow through the cylindrical chamber 36 during the compression stroke (FIG. 2B). It should be understood that the check valve assembly 46 may be reversed from the orientation shown in FIGS. 2A and 2B to be alternatively or additionally arranged within the first passage 48 to affect the damping characteristics of the absorber 10 during the rebound stroke only or both.

Figures 3, 4, 5:
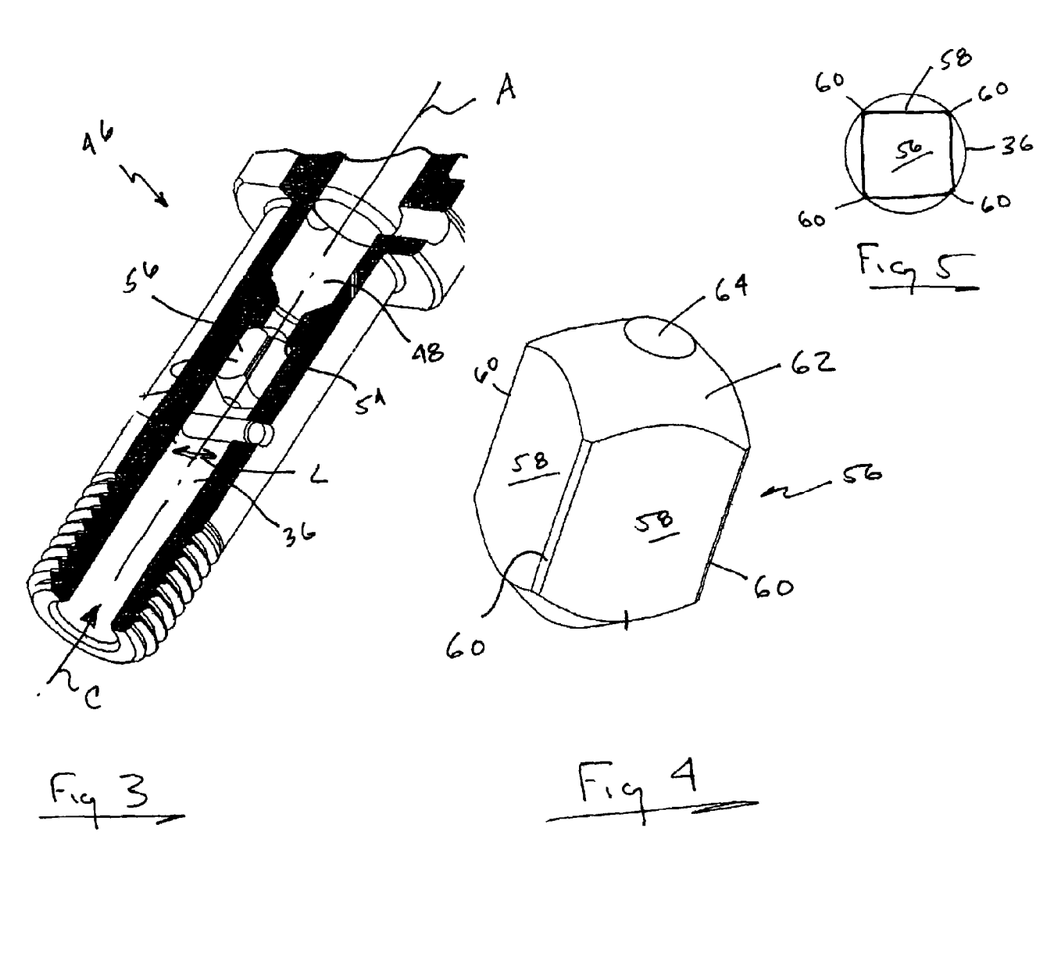
FIG. 3 is an enlarged perspective partial cross-sectional view of the check valve assembly.
FIG. 4 is an enlarged perspective view of the polygonal check valve.
FIG. 5 is a top view of the polygonal check valve within the cylindrical chamber.
Figure 3:
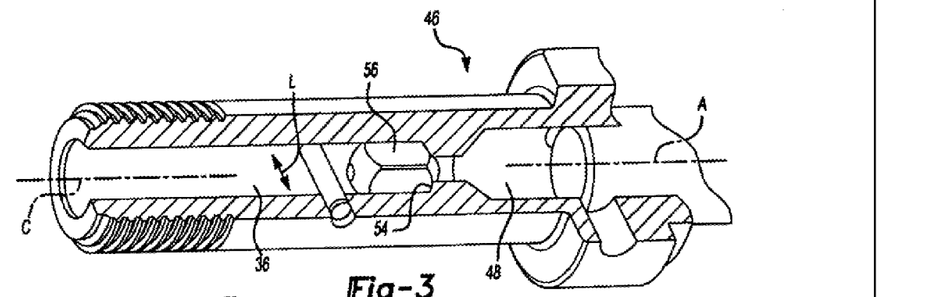
Figure 4:
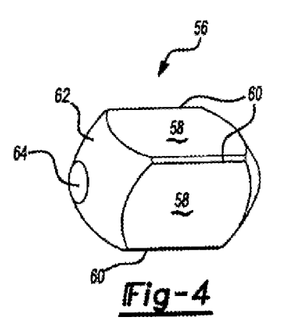
Figure 5:
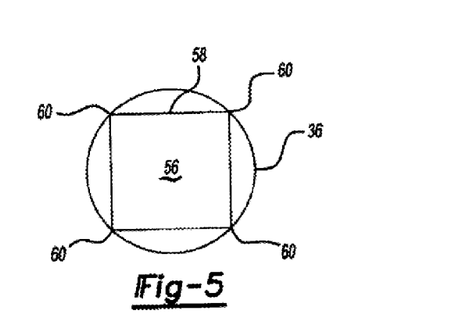

Referring to FIG. 3, the check valve assembly 46 includes a tapered valve seat 54 and a polygonal check valve 56 which moves along axis A to selectively close the check valve in response to pressure from direction C. During the compression stroke, the increase in fluid pressure in the compression chamber 20 (FIG. 1) forces the polygonal check valve 56 from the valve seat 54 to an open position (shown in FIG. 2B) to permit flow of fluid through the cylindrical chamber 36.

Referring to FIG. 4. the polygonal check valve 56 includes a plurality of flat surfaces 58 defined parallel to axis A. That is, the polygonal check valve 56 is substantially polygonal in shape. Each pair of flat surfaces 58 intersects at a linear engagement surface 60 which slidably engage the cylindrical chamber 36 (FIG. 5). It should be understood that the flat surfaces 58 need not be perfectly flat and that any surface which does not engage the cylindrical chamber 36 will benefit form the present invention. It should be further understood that the linear engagement surfaces 60 need not be continuous for the length of the polygonal check valve 56.

The plurality of flat surfaces 58 of polygonal check valve 56 provide for relatively small tolerances between the linear engagement surfaces 60 and the cylindrical chamber 36 (FIG. 5) in comparison to a conventional ball valve. That is, ball valves require clearance between a cylindrical check valve chamber and ball diameter for fluid to flow around the ball when away from a seat. The clearance results in erratic noisy behavior of the conventional check valve in which the ball essentially bounces around within the cylindrical chamber as fluid flows thereby.

When the polygonal check valve 56 is in an open position (FIG. 2B), fluid flows along the flat surfaces 58 even though the linear engagement surfaces 60 are essentially in contact with the cylindrical chamber 36. Lateral movement (schematically illustrated by arrow L) of the check valve 52 relative axis A is effectively eliminated. Reduction of the polygonal check valve 56 lateral movement minimizes noise and vibration of the check valve assembly. Moreover, dampening force remains effectively constant as the polygonal check valve 56 is relatively stable in comparison to an erratically moving conventional ball valve.

The polygonal check valve 56 includes a domed surface 62 substantially transverse to the axis A. The term "domed" as used herein specifically includes any surface which engages a corresponding valve seat and should not be limited to just the hemi-spherical surface illustrated. The domed surface 62 is preferably the inverse of the tapered valve seat 54 to seal the tapered valve seat 54 when in a closed position (FIG. 2A). A circular flat 64 may alternatively or additionally be provided on the domed surface 62 to further assure an effective seal.

Figure 6A:
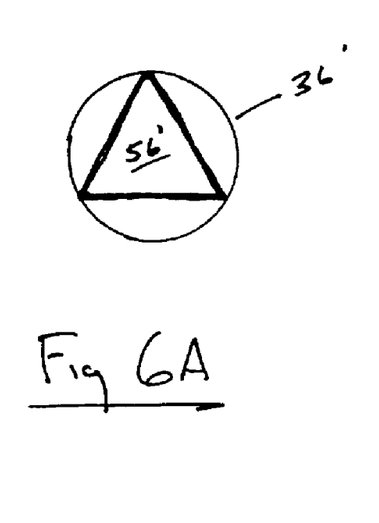
FIG. 6A is a top view of another polygonal check valve within the cylindrical chamber.
Figure 6B:
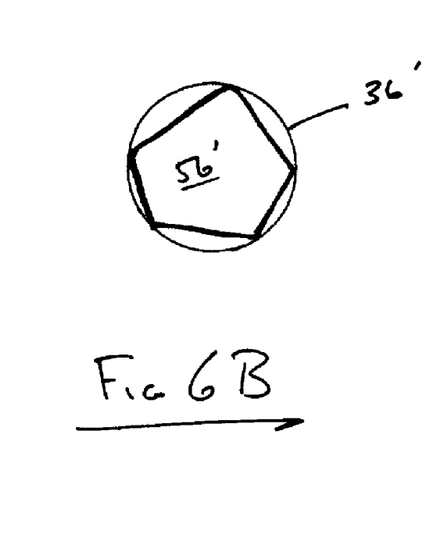
FIG. 6B is a top view of another polygonal check valve within the cylindrical chamber.
Figure 6C:
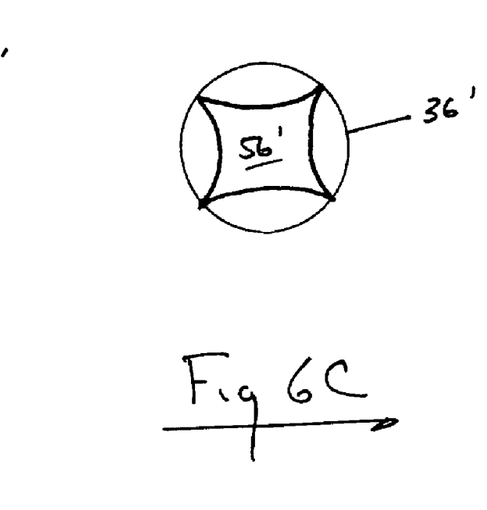
FIG. 6C is a top view of another polygonal check valve within the cylindrical chamber.

Referring to FIGS. 6A–6C, other polygonal shaped check valves 56' which fit within a cylindrical chamber 36' will also benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A shock absorber assembly comprising:
   a shock absorber body defining a cavity at least partially filled wit a fluid;
   a piston slidably disposed within said shock absorber body separating said cavity into first and second chambers;
   a rod secured to said piston and including first and second portions respectively adjacent to said first and said second chambers with a cylindrical chamber extending between said first and said second portions fluidly connecting said first and said second chambers, said cylindrical chamber defining an axis; and
   a polygonal check valve freely slidable longitudinally within said cylindrical chamber along said axis for controlling fluid flow between said first and said second chambers through said cylindrical chamber.

2. The shock absorber assembly as recited in claim 1, wherein said polygonal check valve comprises a plurality of flat surfaces parallel to said axis.

3. The shock absorber assembly as recited in claim 1, wherein said polygonal check valve comprises at least one linear engagement surface slidably engaged wish said cylindrical chamber.

4. The shock absorber assembly as recited in claim 1, wherein said polygonal check valve comprises a domed surface as each end substantially transverse said axis.

5. The shock absorber assembly as recited in claim 4, wherein each of said domed surfaces comprises a circular flat.

6. The shock absorber assembly as recited in claim 4, wherein said cylindrical chamber includes at least one valve seat with at least one of said domed surfaces engageable with said at least one valve seat to seal said cylindrical chamber.

7. The shock absorber assembly as recited in claim 4, wherein said polygonal check valve comprises a solid member.

8. The shock absorber assembly as recited in claim 4, wherein said polygonal check valve maintains a multiple of linear contact surfaces with said cylindrical chamber.

9. A check valve assembly comprising:
a cylindrical chamber defining a longitudinal axis; and
a check valve slidable within said cylindrical chamber along said longitudinal axis between open and closed positions, said check valve including a plurality of flat surfaces extending between first and second valve ends, a domed surface formed on each of said first and said second valve ends, and a plurality of linear engagement surfaces wherein each flat surface is separated from an adjacent flat surface by one of said plurality of linear engagement surfaces.

10. The check valve assembly as recited in claim 9, wherein fluid flows along said plurality of flat surfaces when said check valve is in said open position.

11. The check valve assembly as recited in claim 10, wherein said plurality of linear engagement surfaces remain in substantial engagement with said cylindrical chamber when said check valve is in said open position.

12. The check valve assembly as recited in claim 11, wherein fluid is prevented from flowing along said plurality of flat surfaces when said check valve is in said closed position.

13. The check valve assembly as recited in claim 9, wherein said cylindrical chamber includes at least one valve seat and wherein one of said first and second valve ends is received within said at least one valve seat when said check valve is in said closed position, said valve seat comprising a tapered surface that receives said domed surface of said one of said first and second valve ends.

14. The check valve assembly as recited in claim 9, wherein said plurality of flat surfaces are each defined by a first width and said plurality of linear engagement surfaces are each defined by a second width that is significantly less than said first width and wherein said first and said second widths extend in a direction that is non-parallel to said longitudinal axis.

15. A shock absorber assembly comprising:
a shock absorber body defining a cavity at least partially filled with a fluid;
a piston slidably disposed within said shock absorber body separating said cavity into rebound and compression chambers; and
a check valve assembly including a valve body and a polygonal check valve received within said valve body wherein said valve body is supported by said piston and defines a longitudinal axis, said valve body including a cylindrical chamber in fluid communication with said rebound and said compression chambers and wherein said polygonal check valve moves within said cylindrical chamber along said longitudinal axis to adjust damping characteristics.

16. The shock absorber assembly as recited in claim 15, wherein said valve body includes a first body portion having a first fluid passage in fluid communication with said compression chamber and extending in a direction having a component generally parallel to said longitudinal axis, and wherein said valve body includes a second body portion having a second fluid passage in fluid communication with said rebound chamber and extending in a direction generally transverse to said longitudinal axis, and wherein said polygonal check valve prevents fluid communication between said first and said second fluid passages when said polygonal check valve is in a closed position and allows fluid communication between said first and said second fluid passages when said polygonal check valve is in an open position.

17. The shock absorber assembly as recited in claim 15, including a rod secured to said piston, said rod including a bore for receiving a plunger having a first end and a second end, wherein said first end cooperates with an adjustment mechanism and said second end is receivable within said cylindrical chamber with said adjustment mechanism being actuated to adjust a position of said second end within said cylindrical chamber to control fluid flow through said cylindrical chamber and adjust damping characteristics.

18. The shock absorber assembly as recited in claim 15, including a plurality of flat surfaces extending between first and second valve ends and a plurality of linear engagement surfaces extending generally parallel to said plurality of flat surfaces wherein flat surfaces alternate with linear engagement surfaces about an outer periphery of said polygonal check valve.

19. The shock absorber assembly as recited in claim 18, wherein fluid flows along said plurality of flat surfaces when said polygonal check valve is in an open position and wherein fluid is prevented from flowing along said plurality of flat surfaces when said polygonal check valve is in a closed position with said plurality of linear engagement surfaces remaining in substantial engagement wit said valve body when said check valve is in said open position.

20. The shock absorber assembly as recited in claim 18, including a domed surface formed on each of said first and said second valve ends.

* * * * *

UNITED STATES PATENT AND TRADEMARK OFFICE
CERTIFICATE OF CORRECTION

PATENT NO. : 7,137,491 B2
APPLICATION NO. :10/282658
DATED : November 21, 2006
INVENTOR(S) : Frank Verriet It is certified that error appears in the above-identified patent and that said Letters Patent is hereby corrected as shown below:

The title page showing the illustrative figure should be deleted to be replaced with the attached title page.

The drawing sheets, consisting of Figs. 1-6C, should be deleted to be replaced with the drawing sheets, consisting of Figs. 1-6C, as shown on the attached pages.

Claim 1, Column 4, line 54: "wit" should be --with--

Claim 3, Column 5, line 6: "wish" should be --with--

Claim 4, Column 5, line 10: "as" should be --at--

Claim 19, Column 6, line 54: "wit" should be --with--

Signed and Sealed this

Thirteenth Day of May, 2008

JON W. DUDAS
*Director of the United States Patent and Trademark Office*

(12) United States Patent
Verriet (10) Patent No.: US 7,137,491 B2
(45) Date of Patent: Nov. 21, 2006

(54) SHOCK ABSORBER NON-VIBRATING CHECK VALVE ASSEMBLY

(75) Inventor: Frank Verriet, Mississauga (CA)

(73) Assignee: ArvinMeritor Technology, LLC, Troy, MI (US)

(*) Notice: Subject to any disclaimer, the term of this patent is extended or adjusted under 35 U.S.C. 154(b) by 474 days.

(21) Appl. No.: 10/282,658

(22) Filed: Oct. 29, 2002

(65) Prior Publication Data
US 2004/0079601 A1 Apr. 29, 2004

(51) Int. Cl.
*F16F 9/32* (2006.01)
(52) U.S. Cl. .................. 188/322.13; 137/533.31
(58) Field of Classification Search .......... 188/322.13, 188/322.14, 322.15; 137/528, 533.31, 540
See application file for complete search history.

(56) References Cited

U.S. PATENT DOCUMENTS

| 4,437,492 A | * | 3/1984 | Taylor | 137/543.13 |
| 4,593,921 A | | 6/1986 | Marier | |
| 4,826,260 A | | 5/1989 | Plourde | |
| 4,874,066 A | * | 10/1989 | Silberstein | 188/280 |
| 5,078,240 A | * | 1/1992 | Ackermann et al. | 188/285 |
| 5,085,299 A | * | 2/1992 | Spiess et al. | 188/266.5 |
| 5,370,198 A | | 12/1994 | Karpik | |
| 5,611,681 A | * | 3/1997 | Everitt | 417/569 |
| 5,667,031 A | | 9/1997 | Karpik | |
| 5,881,834 A | | 3/1999 | Karpik | |
| 6,035,896 A | * | 3/2000 | Lisdel | 137/849 |
| 6,102,075 A | * | 8/2000 | Phillips | 138/31 |
| 6,260,832 B1 | * | 7/2001 | Vignocchi et al. | 267/64.15 |

FOREIGN PATENT DOCUMENTS

| CH | 674251 | * | 5/1990 |
| JP | 20010350993 | * | 4/2001 |

OTHER PUBLICATIONS

U.S. Appl. No. 09/950,699, filed Sep. 10, 2001, "Shock Absorber Through the Rod Damping Adjustment".

* cited by examiner

*Primary Examiner* — Devon Kramer
(74) *Attorney, Agent, or Firm* — Carlson, Gaskey & Olds

(57) ABSTRACT

A check valve assembly for a shock absorber includes a tapered valve seat and a polygonal check valve which includes a plurality of flat surfaces. Each pair of flat surfaces intersects at a linear engagement surface which slidably engages a cylindrical chamber. When the polygonal check valve is in an open position, fluid flows along the flat surfaces even though the linear engagement surfaces are essentially in contact with the cylindrical chamber. Lateral movement of the check valve is effectively eliminated which minimizes noise and vibration of the check valve assembly.

28 Claims, 3 Drawing Sheets